United States Patent
Kim

(10) Patent No.: US 10,404,352 B2
(45) Date of Patent: Sep. 3, 2019

(54) INTERFERENCE CANCELLATION REPEATER

(71) Applicants: SOLID, INC., Gyeonggi-do (KR); SOLIDSYSTEMS CO., LTD., Gyeonggi-do (KR)

(72) Inventor: Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/540,774

(22) PCT Filed: Dec. 21, 2015

(86) PCT No.: PCT/KR2015/014055
§ 371 (c)(1),
(2) Date: Sep. 22, 2017

(87) PCT Pub. No.: WO2016/108487
PCT Pub. Date: Jul. 7, 2016

(65) Prior Publication Data
US 2018/0234162 A1    Aug. 16, 2018

(30) Foreign Application Priority Data

Dec. 30, 2014   (KR) .................. 10-2014-0194378
Apr. 7, 2015    (KR) .................. 10-2015-0049299

(51) Int. Cl.
*H04B 7/15*    (2006.01)
*H04B 7/155*   (2006.01)
(Continued)

(52) U.S. Cl.
CPC ..... *H04B 7/15585* (2013.01); *H04B 7/15578* (2013.01); *H04B 17/318* (2015.01);
(Continued)

(58) Field of Classification Search
None
See application file for complete search history.

(56) References Cited

U.S. PATENT DOCUMENTS

2005/0047365 A1* 3/2005 Hong ................ H04W 28/02
                                               370/328
2010/0273415 A1* 10/2010 Almgren ........... H04B 7/15535
                                               455/7

(Continued)

FOREIGN PATENT DOCUMENTS

KR   10-2011-0040201 A    4/2011
KR   10-2011-0119385 A    11/2011

OTHER PUBLICATIONS

Notice to Submit Response issued in KR 10-2015-0049299 dated Jan. 31, 2017.
(Continued)

*Primary Examiner* — Fayyaz Alam
(74) *Attorney, Agent, or Firm* — Sughrue Mion, PLLC

(57) ABSTRACT

According to an aspect of the inventive concept, there is provided an interference cancellation repeater includes: a signal transceiver configured to cancel an interference signal from an RF input signal and to output an RF output signal from which the interference signal has been canceled; and a controller configured to control a power mode of the signal transceiver by measuring traffic of a first signal in the signal transceiver.

12 Claims, 6 Drawing Sheets

(51) Int. Cl.
*H04B 17/318* (2015.01)
*H04W 52/34* (2009.01)
*H04W 52/24* (2009.01)

(52) U.S. Cl.
CPC ....... *H04W 52/343* (2013.01); *H04B 7/15507* (2013.01); *H04W 52/243* (2013.01); *Y02D 70/1244* (2018.01); *Y02D 70/1262* (2018.01); *Y02D 70/1264* (2018.01); *Y02D 70/446* (2018.01)

(56) References Cited

U.S. PATENT DOCUMENTS

| | | | | |
|---|---|---|---|---|
| 2013/0122803 | A1* | 5/2013 | Forster | G06K 7/10009 |
| | | | | 455/11.1 |
| 2014/0226697 | A1* | 8/2014 | Maher | H04L 12/40006 |
| | | | | 375/211 |
| 2015/0236781 | A1* | 8/2015 | Jalali | H04W 84/06 |
| | | | | 370/252 |
| 2018/0026731 | A1* | 1/2018 | Kim | H04B 7/15578 |
| | | | | 455/11.1 |

OTHER PUBLICATIONS

International Search Report of PCT/KR2015/014055 dated Apr. 29, 2016.

* cited by examiner

INTERFERENCE CANCELLATION REPEATER

CROSS-REFERENCE TO RELATED APPLICATIONS

This application is a National Stage of International Application No. PCT/KR2015/014055, filed Dec. 21, 2015, and claims priority from Korean Patent Application No. 10-2014-0194378, filed Dec. 30, 2014, and Korean Patent Application No. 10-2015-0049299, filed Apr. 7, 2015, the contents of which are incorporated herein by reference in their entireties.

BACKGROUND

1. Field

The inventive concept relates to an interference cancellation repeater, and more particularly, to an interference cancellation repeater capable of optimizing power consumption according to presence or absence of traffic.

2. Description of the Related Art

Generally, in order to expand service coverage of a base station or to improve service quality, a repeater is used in a radio-shadow area where intensity of a signal is weak or a signal is difficult to reach. The repeater may be a radio frequency (RF) repeater. The RF repeater receives a base station signal transmitted from the base station via a link antenna, amplifies the received base station signal, and then transmits the amplified signal to a terminal via a service antenna, and further receives a signal transmitted from a user terminal via the service antenna, amplifies the received signal, and then transmit the amplified signal to the base station via the link antenna, thereby repeating communication between the base station and the terminal.

The RF repeater is easy to install because the RF repeater transmits and receives signals wirelessly via the link antenna and the service antenna to/from the base station and the user terminal, respectively. However, due to interference between the link antenna and the service antenna, deterioration of a service signal at high power and oscillation by repetitive reception and amplification of the deteriorated signal may occur, and thus an output gain was limited. Also, due to a spatial restriction according to a demand for miniaturization, it was difficult to secure isolation between the link antenna and the service antenna.

As an alternative to this, an interference cancellation repeater has been proposed. The interference cancellation repeater may estimate interference signals, for example, signals that are radiated via the service antenna (or the link antenna) and re-input to the link antenna (or the service antenna) through various paths, and may cancel the interference signals from input signals using the estimated signals, thereby increasing isolation. Accordingly, the interference cancellation repeater may increase an output gain and prevent oscillation, and may be miniaturized.

Meanwhile, the interference cancellation repeater uses a plurality of amplifiers for canceling interference signals and amplifying signals, and the plurality of amplifiers consume a lot of power. In particular, even when an operation of the interference cancellation repeater is unnecessary, that is, when there is no traffic to be processed by the interference cancellation repeater, the plurality of amplifiers may operate and power is wasted.

SUMMARY

The inventive concept is directed to an interference cancellation repeater capable of reducing power consumption by monitoring presence or absence of traffic and changing a power mode based on the monitoring result.

According to an aspect of the inventive concept, there is provided an interference cancellation repeater for repeating a radio frequency (RF) signal between a terminal and a base station, the interference cancellation repeater includes: a signal transceiver configured to cancel an interference signal from an RF input signal and to output an RF output signal from which the interference signal has been canceled; and a controller configured to control a power mode of the signal transceiver by measuring traffic of a first signal in the signal transceiver.

According to an exemplary embodiment, the controller may include: a traffic measurer configured to compare a power level of the first signal with a reference power level to generate traffic information on whether traffic is generated; and a power controller configured to control the power mode of the signal transceiver based on the traffic information, wherein the power mode may include a normal mode and a sleep mode in which power consumption of the signal transceiver is less than that in the normal mode.

According to an exemplary embodiment, the power controller may be configured to change the normal mode to the sleep mode when a high-level of the traffic information is not detected during a first monitoring time in the normal mode.

According to an exemplary embodiment, the power controller may be configured to change the sleep mode to the normal mode when the high-level of the traffic information is detected during a second monitoring time in the sleep mode.

According to an exemplary embodiment, the first monitoring time may be longer than the second monitoring time.

According to an exemplary embodiment, the interference cancellation repeater may further include a modem that communicates with a management server, and each of the first monitoring time and the second monitoring time is determined according to control of the management server through the modem.

According to an exemplary embodiment, each of the first monitoring time and the second monitoring time may be determined according to control of a local terminal connected to the interference cancellation repeater in a wired or wireless manner.

According to an exemplary embodiment, the power controller may be configured to accumulate the traffic information and determine a predicted sleep time for each predetermined period, and to set the power mode to the sleep mode at the predicted sleep time.

According to an exemplary embodiment, the power controller may be configured to change the sleep mode to the normal mode when a high-level of the traffic information is detected during a second monitoring time in the set sleep mode.

According to an exemplary embodiment, the signal transceiver may include: a receiver configured to analog-to-digital convert the RF input signal to generate a digital input signal; an interference canceller configured to cancel the interference signal from the digital input signal to generate a restored input signal; and a signal transmitter configured to digital-to-analog convert the restored input signal, and to amplify the converted restored input signal to generate and output the RF output signal.

According to an exemplary embodiment, the first signal may be the restored input signal.

According to an exemplary embodiment, the power controller, in the sleep mode, may be configured to reduce a gain of each of the receiver and the interference canceller, to turn off the signal transmitter, or to reduce a gain of each of the receiver and the interference canceller and turn off the signal transmitter.

According to another aspect of the inventive concept, there is provided an interference cancellation repeater for repeating a radio frequency (RF) signal between a terminal and a base station, the interference cancellation repeater includes: a signal transceiver configured to cancel an interference signal from an RF input signal received from the terminal and to output an RF output signal from which the interference signal has been canceled to the base station; and a controller configured to control a power mode of the signal transceiver by measuring traffic of a first signal in the signal transceiver, wherein the power mode includes a normal mode and a sleep mode in which power consumption of the signal transceiver is less than that in the normal mode.

According to an exemplary embodiment, the controller may include: a traffic measurer configured to compare a power level of the first signal with a reference power level to generate traffic information on whether traffic is generated; and a power controller configured to control the traffic information and the power mode of the signal transceiver based on a predicted sleep time for each predetermined period that is determined by accumulating the traffic information.

According to an exemplary embodiment, the power controller may be configured to change the normal mode to the sleep mode when a high-level of the traffic information is not detected during a first monitoring time in the normal mode.

According to an exemplary embodiment, the power controller may be configured to set the power mode to the sleep mode at the predicted sleep time, and to change the sleep mode to the normal mode when a high-level of the traffic information is detected during a second monitoring time in the set sleep mode.

According to an embodiment of the inventive concept, an interference cancellation repeater may reduce power consumption by changing a power mode by monitoring and predicting traffic, and may quickly perform a repeat function when traffic occurs.

BRIEF DESCRIPTION OF THE FIGURES

A brief description of each drawing is provided to more fully understand drawings recited in the detailed description.

DETAILED DESCRIPTION OF EXEMPLARY EMBODIMENTS

Figure 1:
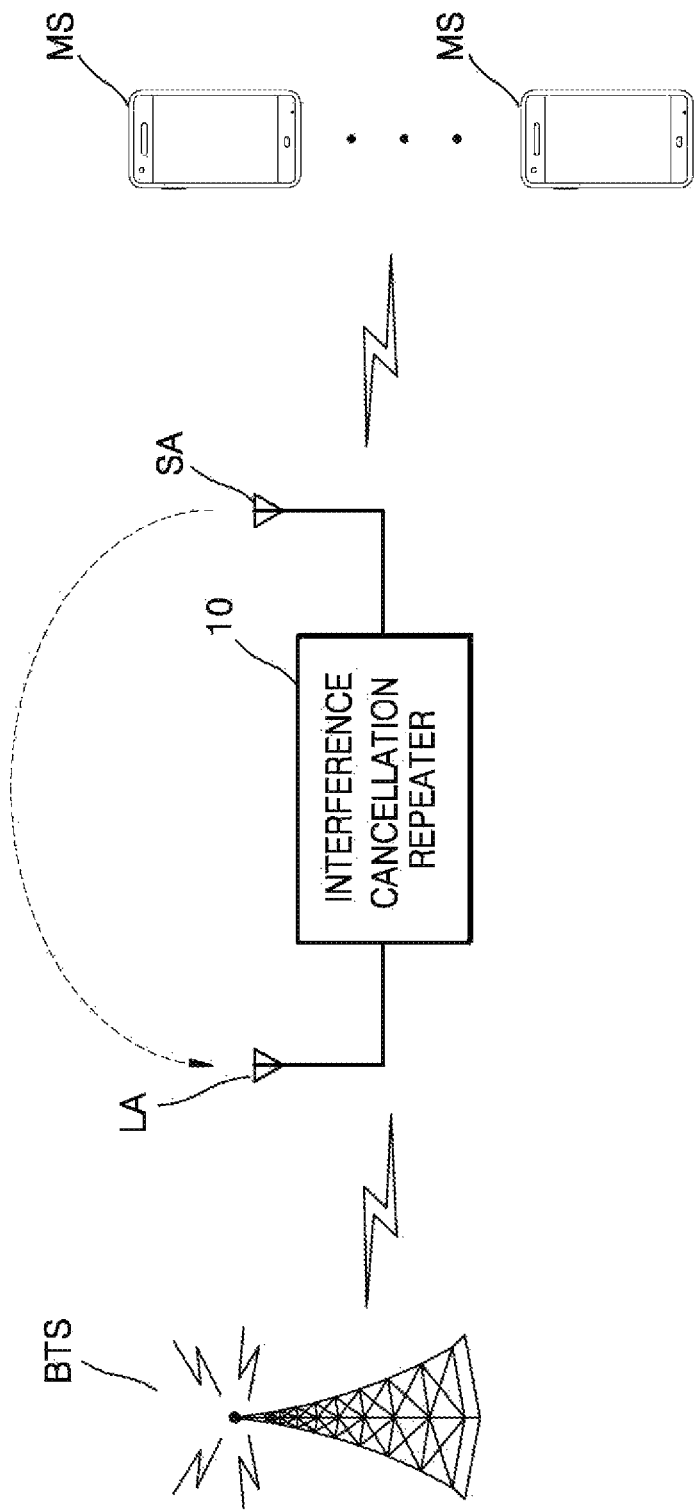
FIG. 1 is a view for explaining a repeat environment of an interference cancellation repeater, according to an embodiment of the inventive concept.

As the inventive concept allows for various changes and numerous embodiments, embodiments will be illustrated in the drawings and described in detail in the written description. However, this does not limit the inventive concept to specific example embodiments, and it should be understood that the inventive concept covers all the modifications, equivalents and replacements included within the scope of the inventive concept. In describing the inventive concept, in the following description, a detailed explanation of known related technologies may be omitted to avoid unnecessarily obscuring the subject matter of the inventive concept.

It will be understood that, although the terms first, second, etc. may be used herein to describe various elements, these elements should not be limited by these terms. These terms are only used to distinguish one element from another.

The terms used in this application, only certain embodiments have been used to describe, is not intended to limit the inventive concept. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

An interference cancellation repeater according to an embodiment of the inventive concept may support mobile communication services used worldwide. For example, the interference cancellation repeater may support services for frequencies such as a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the interference cancellation repeater may support a number of mobile communication services such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), and so on.

Hereinafter, embodiments of the inventive concept will be described in detail with reference to the accompanying drawings.

FIG. 1 is a view for explaining a repeat environment of an interference cancellation repeater 10, according to an embodiment of the inventive concept.

Referring to FIG. 1, the interference cancellation repeater 10 may amplify a radio frequency (RF) input signal received via a link antenna LA in a case of downlink and transmit the amplified RF input signal to a user terminal MS via a service antenna SA. The RF input signal may include a base station signal transmitted from a base station BTS and an interference signal in which signals radiated via the service antenna SA are re-input to the link antenna LA. Furthermore, the interference cancellation repeater 10 may oscillate as the base station signal and the interference signal are amplified together by a high power amplifier (not shown). The interference cancellation repeater 10 may solve the oscillation problem by including an interference canceller (not shown) capable of estimating the interference signal and canceling the same from the RF input signal on a side of the link antenna LA.

Meanwhile, the interference cancellation repeater 10 may amplify the RF input signal received via the service antenna SA in a case of uplink and transmit the amplified RF input signal to the base station BTS via the link antenna LA. Although not shown in FIG. 1, in the case of uplink, signals radiated via the link antenna LA may be input to the service antenna SA through a wireless environment to form an interference signal, and thus, the interference cancellation repeater 10 may oscillate as a signal of the user terminal MS and the interference signal are included in the input signals received via the service antenna SA and are amplified together by the high power amplifier. As in the case of downlink, the interference cancellation repeater 10 may solve the oscillation problem by including an interference canceller 130 (see FIG. 2) capable of estimating the interference signal and canceling the same from the RF input signal on a side of the service antenna SA.

The present specification mainly describes signal processing of an uplink path in the interference cancellation repeater 10 for convenience of explanation, and signal processing of a downlink path in the interference cancellation repeater 10 corresponds to the signal processing of the uplink path. Therefore, a detailed description thereof will not be given herein.

When it is determined that there is no traffic by monitoring traffic on the downlink path and/or the uplink path, the interference cancellation repeater 10 may reduce power consumption thereof by turning off the power of a plurality of amplifiers included in the interference cancellation repeater 10 or reducing a gain. This will be described later below in detail with reference to FIGS. 2 to 6.

Figure 2:
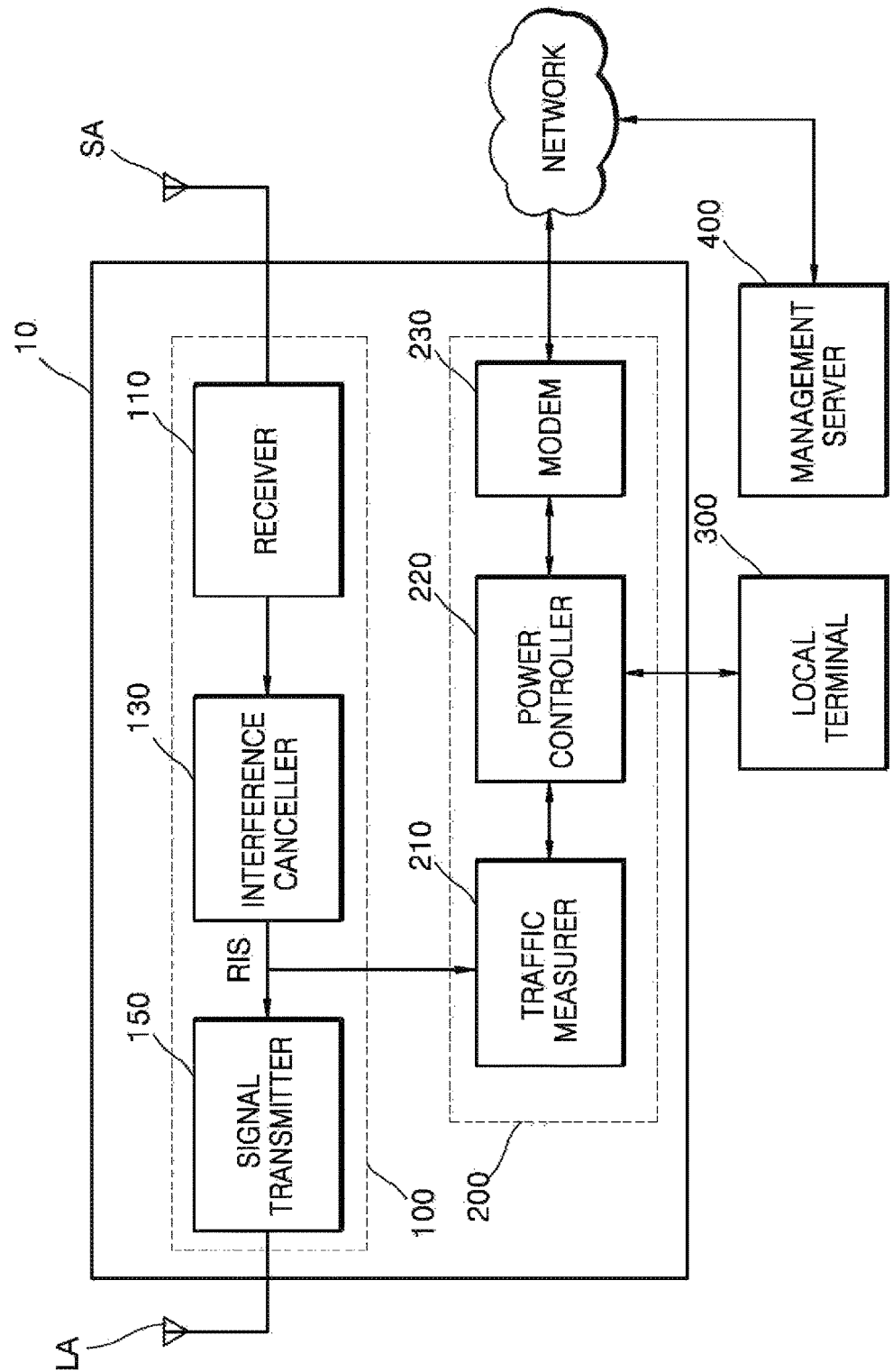
FIG. 2 is a schematic block diagram of an interference cancellation repeater, according to an embodiment of the inventive concept.
Figure 3:
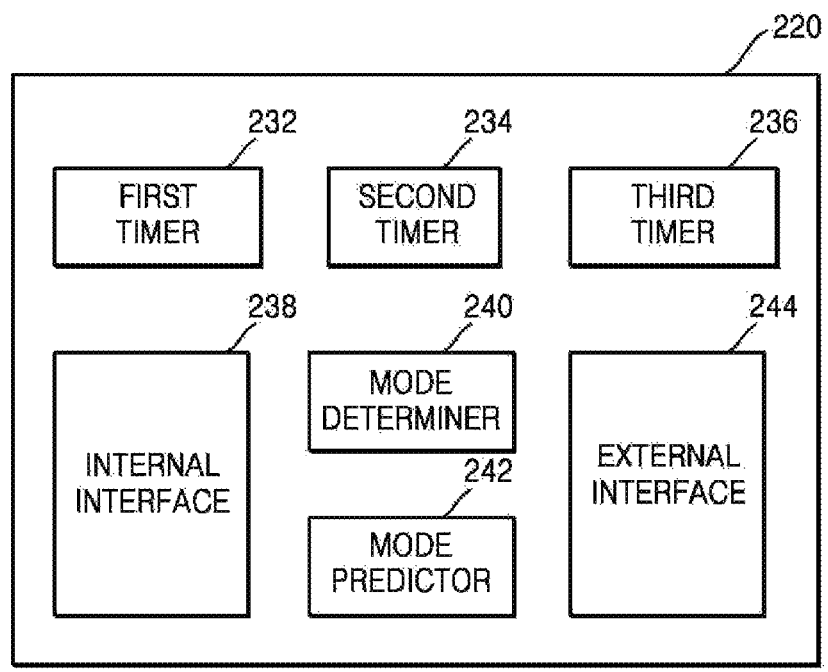
FIG. 3 is a detailed block diagram of a power controller of FIG. 2.

FIG. 2 is a schematic block diagram of the interference cancellation repeater 10, according to an embodiment of the inventive concept. FIG. 3 is a detailed block diagram of a power controller 220 of FIG. 2.

Referring to FIG. 2, the interference cancellation repeater 10 may include the link antenna LA, the service antenna SA, a signal transceiver 100, and a controller 200. As described above in FIG. 1, the present specification mainly describes the signal processing of the uplink path in the interference cancellation repeater 10 for convenience of explanation, and signal processing of the downlink path in the interference cancellation repeater 10 corresponds to the signal processing of the uplink path. Therefore, detailed descriptions and drawings thereof will not be given herein.

FIG. 2 illustrates that the interference cancellation repeater 10 includes one link antenna LA and one service antenna SA, but the inventive concept is not limited thereto. The interference cancellation repeater 10 may include at least two link antennas and at least two service antennas. Here, the interference canceller 130 described later below may be implemented for each signal path between the corresponding link antenna and service antenna, or may be integrally implemented for at least two signal paths. Similarly, the controller 200 described later below may also be implemented for each signal path between the corresponding link antenna and service antenna, or may be integrally implemented for at least two signal paths.

The signal transceiver 100 may cancel an interference signal from an RF input signal input from the service antenna SA and may output an RF output signal from which the interference signal has been canceled.

The signal transceiver 100 may include a receiver 110, an interference canceller 130, and a signal transmitter 150.

The receiver 110 may receive the RF input signal via the service antenna SA communicatively coupled to a user terminal MS (see FIG. 2). The RF input signal may include a user terminal signal and an interference signal in which signals radiated via the link antenna LA are re-input to the service antenna SA.

The receiver 110 may adjust a gain of the RF input signal. For example, the receiver 110 may include an amplifier (not shown) and may adjust the gain of the RF input signal through the amplifier (not shown). Furthermore, the receiver 110 may convert the RF input signal whose gain is adjusted by the amplifier (not shown) into a digital input signal and may output the digital input signal.

The interference canceller 130 may cancel the interference signal from an output signal of the receiver 110, that is, a digital input signal. In more detail, the interference canceller 130 may estimate a signal corresponding to the interference signal based on the digital input signal from which the interference signal has been canceled, and may cancel the interference signal from the digital input signal using the estimated signal.

Furthermore, the interference canceller 130 may adjust a gain of the interference-canceled digital input signal. The interference canceller 130 may include an amplifier (not shown) and may adjust the gain of the interference-canceled digital input signal through the amplifier (not shown). Therefore, the interference canceller 130 may adjust the gain of the interference-canceled digital input signal, i.e., a digitized user terminal signal and output the result as a restored input signal RIS.

The signal transmitter 150 may digital-to-analog convert the output signal of the interference canceller 130, that is, the restored input signal RIS, into an analog signal. The signal transmitter 150 may amplify an analog-converted user terminal signal, that is, the RF output signal and may transmit the result via the service antenna SA. Although not shown in FIG. 2, the signal transmitter 150 may include a digital-to-analog converter for converting the digitized user terminal signal into an analog signal, a frequency-up converter for up-converting the analog-converted user terminal signal into a signal of a radio frequency band, and a power amplifier for amplifying the up-converted user terminal signal. The frequency-up converter may be optionally omitted. Also, although not shown in FIG. 2, the signal transmitter 150 may further include an isolator or the like for protecting the power amplifier at a rear end of the power amplifier.

The controller 200 may control a power mode of the signal transceiver 100 by measuring traffic of a first signal in the signal transceiver 100. Although the first signal may be any signal transmitted and received in the signal transceiver 100, the first signal is the restored input signal RIS in the present specification. However, the scope of the inventive concept is not limited thereto.

The controller 200 may include a traffic measurer 210, a power controller 220, and a modem 230.

The traffic measurer 210 may generate traffic information on whether traffic is generated by comparing a power level of the restored input signal RIS with a reference power level.

The traffic measurer 210 may measure the power level of the restored input signal RIS for a predetermined time (e.g., 0.1 second) and calculate the average during the time. The traffic measurer 210 may compare the calculated average power level with the reference power level and generate traffic information for the predetermined time according to the comparison result. For example, the traffic information may be composed of 1-bit data. If the average power level is higher than the reference power level, traffic information having a high-level may be generated. If the average power level is lower than the reference power level, traffic information having low-level may be generated.

According to another embodiment, the traffic measurer 210 may measure the power level of the restored input signal RIS in a unit of a digital sampling time during the digital sampling time. The traffic measurer 210 may compare the measured power level with the reference power level and generate traffic information for the digital sampling time according to the comparison result.

According to still another embodiment, the traffic measurer 210 may measure the power level of the restored input signal RIS in units of a plurality of digital sampling times during the digital sampling times, respectively, and may calculate an average power level or a moving average for the plurality of digital sampling times. The traffic measurer 210 may compare the calculated average power level or moving average with the reference power level and generate traffic information for the plurality of digital sampling times according to the comparison result.

Here, the reference power level, the predetermined time, the digital sampling time, the plurality of digital sampling times, and the like may be set by default, but may be set by the power controller 220, a local terminal 300, or a management server 400.

The power controller 220 may control the power mode of the signal transceiver 100 based on the traffic information.

The power mode includes a normal mode and a sleep mode.

The normal mode may be a mode in which a process from a reception of the input RF signal to an output of the output RF signal of the signal transceiver 100 is normally performed.

Power consumption of the signal transceiver 100 in the sleep mode may be less than that in the normal mode.

According to an embodiment, the power controller 220, in the sleep mode, may adjust a gain of an amplifier included in at least one of the components 110, 130, and 150 of the signal transceiver 100 to reduce power consumption of the signal transceiver 100.

According to another embodiment, the power controller 220, in the sleep mode, may adjust a gain of an amplifier included in each of the receiver 110 and the interference canceller 130 of the signal transceiver 100 and turn off the signal transmitter 150 to reduce power consumption of the signal transceiver 100. This is to turn off unnecessary power of the signal transmitter 150 when the power consumption is the greatest and there is no traffic, and to adjust the gain of the amplifier included in each of the receiver 110 and the interference canceller 130 instead of power-off for continuous monitoring of traffic, thereby reducing power consumption.

According to still another embodiment, the power controller 220, in the sleep mode, may turn off only the signal transmitter 150 to reduce power consumption of the signal transceiver 100. This is to turn off only the signal transmitter 150, which has the greatest power consumption, and to monitor traffic more accurately.

However, embodiments in which the power controller 220 in the sleep mode reduces power consumption of the signal transmitter 150 do not limit the scope of the inventive concept. The method of reducing power consumption of the signal transmitter 150 by the power controller 220 of the inventive concept may be changed within a range where power consumption of the signal transceiver 100 is less than that in the normal mode.

Here, the operation of adjusting the gain of the amplifier may be an operation of adjusting an amplifier bias voltage of each amplifier.

When the gain of the amplifier included in each of the receiver 110 and the interference canceller 130 is adjusted in the sleep mode, a reference power level of the traffic measurer 210 may be adjusted together. This is because a level of a signal output from the receiver 110 and the interference canceller 130 is reduced compared with that in the normal mode, so that a normal monitoring operation may be performed only when the reference power level is reduced at a corresponding ratio.

Referring to FIG. 3, the power controller 220 may include a first timer 232, a second timer 234, a third timer 236, an internal interface 238, a mode determiner 240, a mode predictor 242, and an external interface 244.

The first timer 232 may store a first monitoring time and notify the mode determiner 240 of the start and end of the first monitoring time. The second timer 234 may store a second monitoring time and notify the mode determiner 240 of the start and end of the second monitoring time. The third timer 236 may store a predicted sleep time and notify the mode determiner 240 of the start and end of the predicted sleep time. Here, a description of each of the first monitoring time, the second monitoring time, and the predicted sleep time will be described later below with reference to a description of the mode determiner 240.

The internal interface 238 may be an interface device for exchanging signals with the respective components 100, 210, and 230 in the interference cancellation repeater 10.

The mode determiner 240 may determine the power mode of the signal transceiver 100 by referring to the first to third timers 232 to 236 based on the traffic information and control the signal transceiver 100 according to the determined power mode. When the high-level of the traffic information is not detected during the first monitoring time in the normal mode, the mode determiner 240 may change the normal mode to the sleep mode. That is, the mode determiner 240 may change the power mode of the signal transceiver 100 to the sleep mode when no traffic is detected as a result of monitoring the restored input signal RIS during the first monitoring time.

When the high-level of the traffic information is detected during the second monitoring time in the sleep mode, the mode determiner 240 may change the sleep mode to the normal mode. That is, the mode determiner 240 may change the power mode of the signal transceiver 100 to the normal mode when traffic is detected as a result of monitoring the restored input signal RIS during the second monitoring time. Therefore, the first monitoring time may be a time for determining the entry from the normal mode to the sleep mode, and the second monitoring time may be a time for determining the entry from the sleep mode to the normal mode.

Each of the first monitoring time and the second monitoring time may be determined according to control of the local terminal 300 connected to the interference cancellation repeater 10 through the external interface 244 in a wired or wireless manner. According to another embodiment, each of the first monitoring time and the second monitoring time may be determined according to control of the management server 400 connected to the interference cancellation repeater 10 through the internal interface 238 and the modem 230 via a network. The network may also refer to a wireless or wired network. Here, the first monitoring time may be set to be longer than the second monitoring time. This is because switching from the normal mode to the sleep mode may cause loss of an RF signal to be repeated by the interference cancellation repeater 10 and needs to be more carefully performed.

Recognizing that a current predicted sleep time has arrived by referring to the third timer in the normal mode, the mode determiner 240 may change the normal mode to the sleep mode.

The mode predictor 242 may accumulate the traffic information and determine a predicted sleep time for each predetermined period. That is, the mode predictor 242 may determine a time period in which no traffic is detected within a predetermined period based on the accumulation result of the traffic information, and may determine the time period as the predicted sleep time.

For example, when no traffic is detected at any time between 3:00 am and 6:00 am on a daily basis in the accumulation result of the traffic information, the mode predictor 242 may determine the time period (3:00 am to 6:00 am) as the predicted sleep time. The predetermined period may be days, weeks, months, or a combination thereof. The mode predictor 242 may store the predicted sleep time for the predetermined period in the third timer 236. Even if the mode determiner 240 changes the power mode to the sleep mode at the predicted sleep time determined by the mode predictor 242, the mode determiner 240 may immediately change the power mode to the normal mode when high-level traffic information as a result of monitoring by the traffic measurer 210 at the second monitoring time is detected.

On the other hand, even if the mode determiner 240 changes the power mode to the normal mode after the predicted sleep time determined by the mode predictor 242 has elapsed, the mode determiner 240 may change the power mode to the sleep mode when high-level traffic information as a result of monitoring by the traffic measurer 210 at the first monitoring time is not detected. Therefore, the mode predictor 242 may supplement the power mode determination operation of the mode determiner 240 in a statistical aspect.

The external interface 244 may be an interface device for exchanging signals with the local terminal 300 outside the interference cancellation repeater 10.

Referring again to FIG. 2, the modem 230 may repeat data between the power controller 220 and the management server 400.

The local terminal 300 may be connected to the interference cancellation repeater 10 in a wired or wireless manner, and may receive statistics on traffic information received by the power controller 220, real-time conditions, and the like. Also, as described above, the local terminal 300 may set various setting values (e.g., the first monitoring time) of the power controller 220. Here, the connection between the local terminal 300 and the interference cancellation repeater 10 may be realized by a wireless Universal Serial Bus (USB), Ethernet, a Universal Asynchronous Receiver Transmitter (UART), or the like.

The management server 400 may be connected to the interference cancellation repeater 10 via a network, and may periodically receive statistics on traffic information received by the power controller 220, real-time conditions, and the like. Also, as described above, the management server 400 may set various setting values (e.g., the first monitoring time) of the power controller 220.

According to an embodiment of the inventive concept, the interference cancellation repeater 100 may reduce power consumption by changing a power mode by monitoring and predicting traffic, and may quickly perform a repeat function when traffic occurs.

Figure 4:
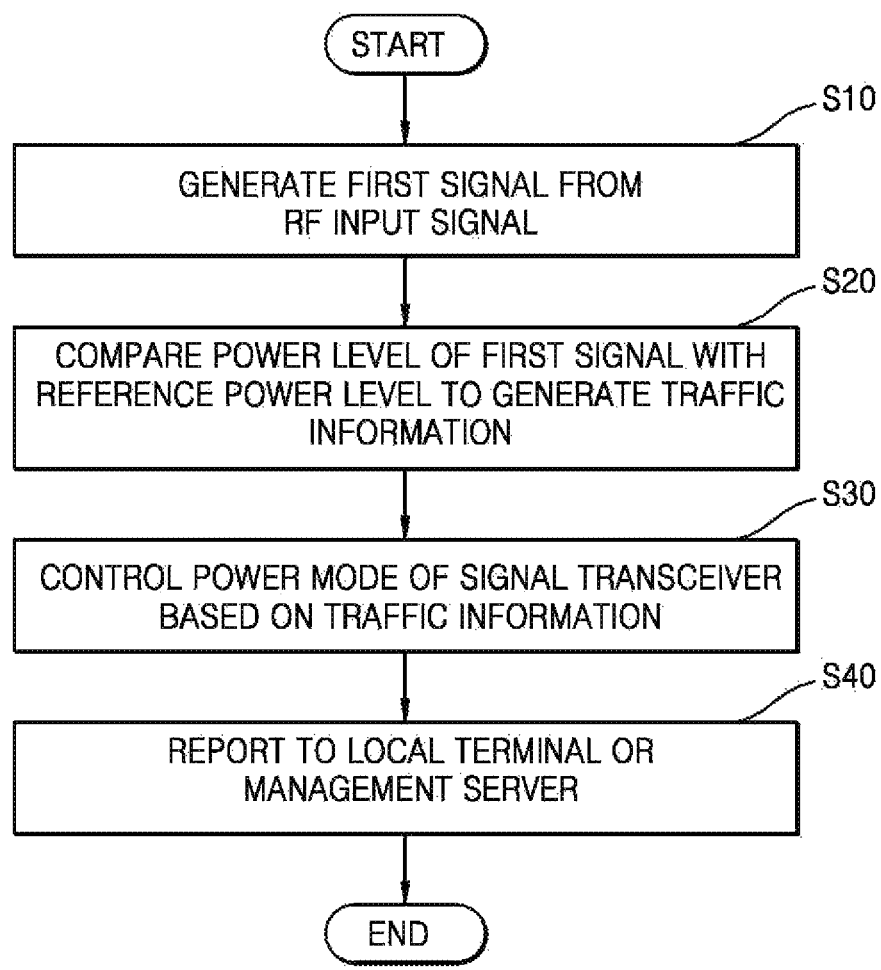
FIG. 4 is a flowchart for explaining a method of operating the interference cancellation repeater of FIG. 1.
Figure 5:
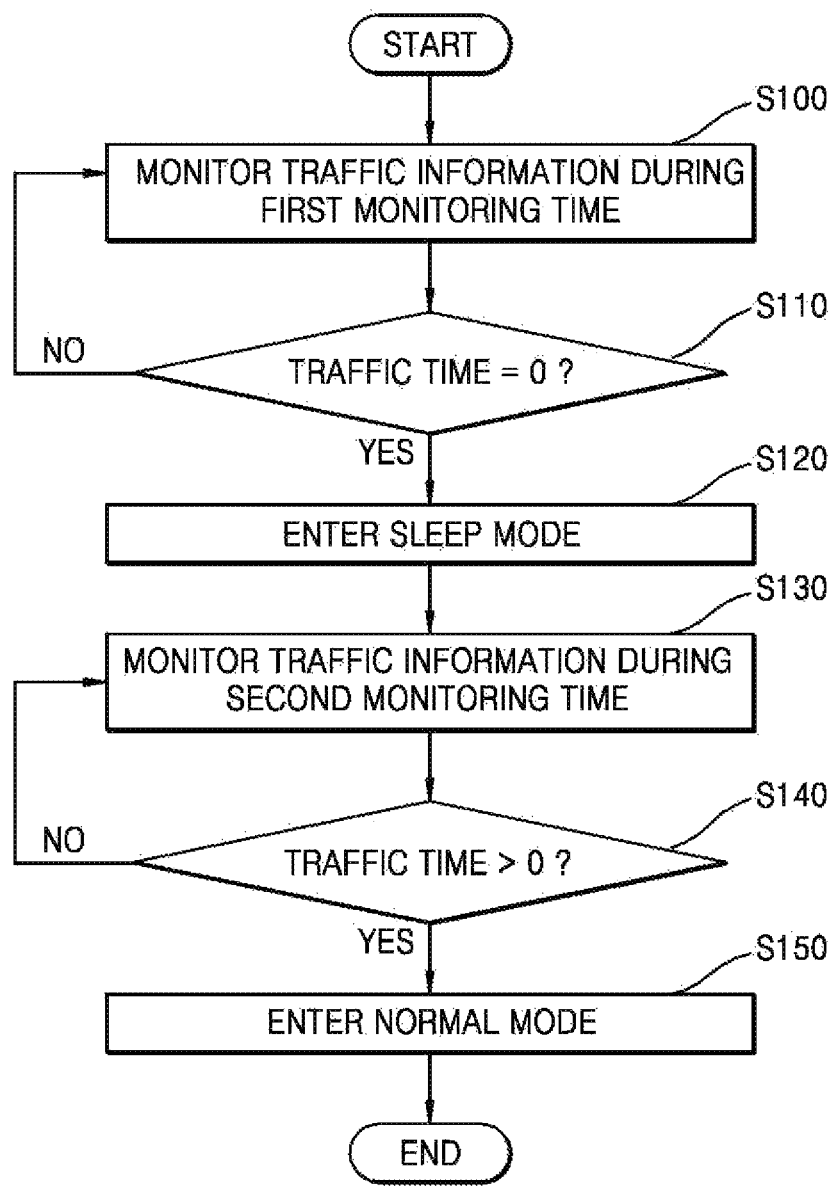
FIG. 5 is a flowchart of an embodiment of a power mode determination operation of FIG. 4.
Figure 6:
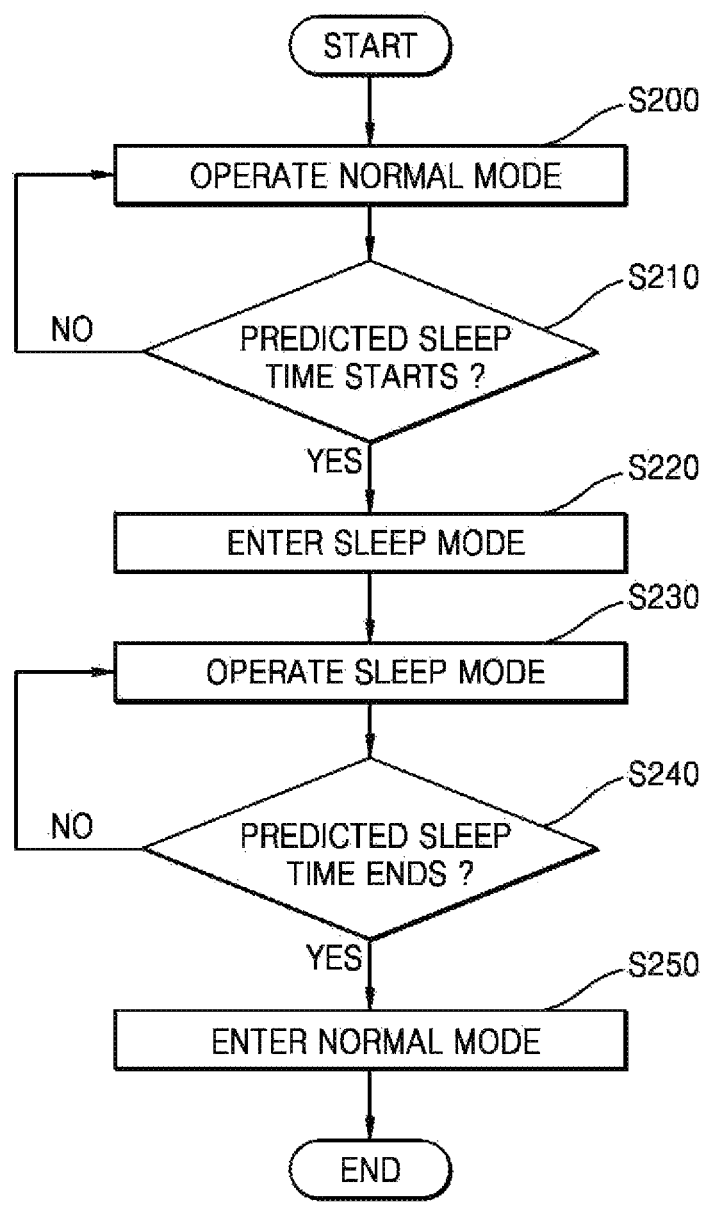
FIG. 6 is a flowchart of another embodiment of the power mode determination operation of FIG. 4.

FIG. 4 is a flowchart for explaining a method of operating the interference cancellation repeater 10 of FIG. 1. FIG. 5 is a flowchart of an embodiment of a power mode determination operation of FIG. 4. FIG. 6 is a flowchart of another embodiment of the power mode determination operation of FIG. 4.

Referring to FIGS. 1 to 6, in operation S10, the signal transceiver 100 may receive an RF input signal and generate a first signal (e.g., RIS).

In operation S20, the traffic measurer 210 may compare a power level of the first signal with a reference power level to generate traffic information on whether traffic is generated.

In operation S30, the power controller 220 may control a power mode of the signal transceiver 100 based on the traffic information.

FIG. 5 shows an embodiment in which the power controller 220 controls the power mode by referring to the first timer 232 and the second timer 234 based on the traffic information. In FIG. 5, it is assumed that the power mode of the signal transceiver 100 is set to the normal mode.

In operation S100, the mode determiner 240 may monitor the traffic information during the first monitoring time in the normal mode. The mode determiner 240 may calculate a traffic time, which is time information in which periods having the high-level traffic information are accumulated.

When the traffic time is not 0, that is, when the high-level traffic information is detected ("NO" of operation S110), the mode determiner 240 may monitor the traffic information again for the following first monitoring time.

In operation S120, when the traffic time is 0, that is, when the high-level traffic information is not detected ("YES" of operation S110), the mode determiner 240 may change the power mode of the signal transceiver 100 to the sleep mode.

In operation S130, the mode determiner 240 may monitor the traffic information during the second monitoring time in the sleep mode. The mode determiner 240 may calculate a traffic time, which is time information in which periods having the high-level traffic information are accumulated.

When the traffic time is 0, that is, when the high-level traffic information is not detected ("NO" of operation S140), the mode determiner 240 may monitor the traffic information again for the following second monitoring time.

In operation S120, when the traffic time is greater than 0, that is, when the high-level traffic information is detected ("YES" of operation S140), the mode determiner 240 may change the power mode of the signal transceiver 100 to the normal mode.

Here, the first monitoring time and after the first monitoring time, the second monitoring time and after the second monitoring time, and the first monitoring time and the second monitoring time may be continuous or intermittent.

FIG. 6 shows an embodiment in which the power controller 220 controls the power mode by referring to the third timer 236 based on the traffic information.

In FIG. 6, it is assumed that the power mode of the signal transceiver 100 is set to the normal mode, and the third timer 236 stores a predicted sleep time determined based on the traffic information.

In operation S200, the mode determiner 240 may operate the signal transceiver 100 by setting the power mode of the signal transceiver 100 to the normal mode at a time other than the predicted sleep time. Here, the third timer 236 may notify the mode determiner 240 of the start of the predicted sleep time through a trigger signal.

When the predicted sleep time has not started ("NO" of operation S210), the mode determiner 240 may operate the signal transceiver 100 by setting the power mode of the signal transceiver 100 to the normal mode.

In operation S220, when the predicted sleep time has started ("YES" of operation S210), the mode determiner 240 may change the power mode of the signal transceiver 100 to the sleep mode.

In operation S220, the mode determiner 240 may operate the signal transceiver 100 by setting the power mode of the signal transceiver 100 to the sleep mode at the predicted sleep time. Here, the third timer 236 may notify the mode determiner 240 of the end of the predicted sleep time through a trigger signal.

When the predicted sleep time has not ended ("NO" of operation S240), the mode determiner 240 may operate the signal transceiver 100 by setting the power mode of the signal transceiver 100 to the sleep mode.

In operation S220, when the predicted sleep time has ended ("YES" of operation S240), the mode determiner 240 may change the power mode of the signal transceiver 100 to the normal mode.

Here, operations S130 to S150 of FIG. 5 may be performed when a sleep mode operation is performed in operation S220, and operations S100 to S120 of FIG. 5 may be performed when a normal mode operation is performed in operation S200.

Furthermore, operations S220 to S230 may be performed when a sleep mode operation is performed in operation S120 of FIG. 5, and operations S200 to S220 may be performed when a normal mode operation is performed in operation S150 of FIG. 5.

That is, power mode control referring to the first timer 232 and the second timer 234 and power mode control referring to the third timer 236 are complementary to each other, so that the power consumption of the interference cancellation repeater 10 may be effectively reduced.

In operation S40, the power controller 220 may report statistics on traffic information, real-time conditions, and the like to the local terminal 300 or the management server 400.

The method of operating the interference cancellation repeater 10 according to the inventive concept can be embodied as computer-readable codes on a non-transitory computer-readable recording medium. The non-transitory computer-readable recording medium is any recording medium that can store data which can thereafter be read by a computer system. The non-transitory computer-readable recording medium may include, for example, read-only memory (ROM), random-access memory (RAM), magnetic tapes, magnetic disks, flash memory, optical data storage devices, etc. The non-transitory computer-readable recording medium can also be distributed over computer network-coupled computer systems so that a computer-readable code is stored and executed in a distributive manner.

While the embodiments have been particularly shown and described, it will be understood by those of ordinary skill in the art that various changes in form and details may be made therein without departing from the scope of the inventive concept as defined by the appended claims.

The invention claimed is:

1. An interference cancellation repeater comprising:
a signal transceiver which includes:
a receiver configured to analog-to-digital convert a RF input signal to generate a digital input signal;
an interference canceller implemented with at least one processor and configured to cancel an interference signal from the digital input signal to generate a restored input signal; and
a transmitter configured to digital-to-analog convert the restored input signal, and amplify the converted restored input signal to generate and output an RF output signal; and
a controller which includes at least one processor to implement:
a traffic measurer configured to compare a power level of a first signal in the signal transceiver with a reference power level to generate traffic information; and
a power controller configured to control a power mode of the signal transceiver based on the traffic information,
wherein the power mode includes a normal mode and a sleep mode in which power consumption of the signal transceiver is less than that in the normal mode, and
wherein the power controller, in the sleep mode, is configured to reduce a gain of each of the receiver and the interference canceller, turn off the transmitter, or reduce a gain of each of the receiver and the interference canceller and turn off the transmitter.

2. The interference cancellation repeater of claim 1, wherein
the power controller is configured to change the normal mode to the sleep mode when a high-level of the traffic information is not detected during a first monitoring time in the normal mode.

3. The interference cancellation repeater of claim 2, wherein
the power controller is configured to change the sleep mode to the normal mode when the high-level of the traffic information is detected during a second monitoring time in the sleep mode.

4. The interference cancellation repeater of claim 3, wherein
the first monitoring time is longer than the second monitoring time.

5. The interference cancellation repeater of claim 1, wherein
the first signal is the restored input signal.

6. An interference cancellation repeater, comprising:
a signal transceiver configured to cancel an interference signal from an RF input signal received from a terminal and to output an RF output signal from which the interference signal has been canceled to a base station; and
a controller configured to control a power mode of the signal transceiver by monitoring traffic based on a first signal in the signal transceiver,
wherein the power mode includes a normal mode and a sleep mode in which power consumption of the signal transceiver is less than that in the normal mode, and
wherein the controller includes at least one processor to implement:
a traffic measurer configured to compare a power level of the first signal with a reference power level to generate traffic information on whether traffic is generated; and
a power controller configured to control the power mode of the signal transceiver based on the traffic information and a predicted sleep time for each predetermined period that is determined by accumulating the traffic information.

7. The interference cancellation repeater of claim 6, wherein
the power controller is configured to change the normal mode to the sleep mode when a high-level of the traffic information is not detected during a first monitoring time in the normal mode.

8. The interference cancellation repeater of claim 6, wherein
the power controller is configured to set the power mode to the sleep mode at the predicted sleep time, and to change the sleep mode to the normal mode when a high-level of the traffic information is detected during a second monitoring time in the set sleep mode.

9. An interference cancellation repeater comprising:
a signal transceiver configured to cancel an interference signal from an RF input signal and to output an RF output signal from which the interference signal has been canceled; and
a controller configured to control a power mode of the signal transceiver by monitoring traffic based on a first signal in the signal transceiver,
wherein the controller includes at least one processor to implement:
a traffic measurer configured to compare a power level of the first signal in the signal transceiver with a reference power level to generate traffic information; and
a power controller configured to control a power mode of the signal transceiver based on the traffic information,
wherein the power mode includes a normal mode and a sleep mode in which power consumption of the signal transceiver is less than that in the normal mode,
wherein the power controller is configured to change the normal mode to the sleep mode when a high-level of the traffic information is not detected during a first monitoring time in the normal mode,
wherein the power controller is configured to change the sleep mode to the normal mode when the high-level of the traffic information is detected during a second monitoring time in the sleep mode, and
wherein the interference cancellation repeater further comprises a modem that communicates with a management server, and at least one of the first monitoring time and the second monitoring time is determined according to control of the management server through the modem.

10. An interference cancellation repeater comprising:
a signal transceiver configured to cancel an interference signal from an RF input signal and to output an RF output signal from which the interference signal has been canceled; and
a controller configured to control a power mode of the signal transceiver by monitoring traffic based on a first signal in the signal transceiver,
wherein the controller includes at least one processor to implement:
a traffic measurer configured to compare a power level of the first signal in the signal transceiver with a reference power level to generate traffic information; and
a power controller configured to control a power mode of the signal transceiver based on the traffic information,
wherein the power mode includes a normal mode and a sleep mode in which power consumption of the signal transceiver is less than that in the normal mode,
wherein the power controller is configured to change the normal mode to the sleep mode when a high-level of the traffic information is not detected during a first monitoring time in the normal mode,
wherein the power controller is configured to change the sleep mode to the normal mode when the high-level of the traffic information is detected during a second monitoring time in the sleep mode, and
wherein at least one of the first monitoring time and the second monitoring time is determined according to control of a local terminal connected to the interference cancellation repeater in a wired or wireless manner.

11. An interference cancellation repeater comprising:
a signal transceiver configured to cancel an interference signal from an RF input signal and to output an RF output signal from which the interference signal has been canceled; and
a controller configured to control a power mode of the signal transceiver by monitoring traffic based on a first signal in the signal transceiver,
wherein the controller includes at least one processor to implement:
a traffic measurer configured to compare a power level of the first signal in the signal transceiver with a reference power level to generate traffic information; and
a power controller configured to control a power mode of the signal transceiver based on the traffic information,
wherein the power mode includes a normal mode and a sleep mode in which power consumption of the signal transceiver is less than that in the normal mode,
wherein the power controller is configured to accumulate the traffic information and determine a predicted sleep time for each predetermined period, and to set the power mode to the sleep mode at the predicted sleep time.

12. The interference cancellation repeater of claim 11, wherein the power controller is configured to change the sleep mode to the normal mode when a high-level of the traffic information is detected during a second monitoring time in the set sleep mode.

* * * * *